United States Patent [19]

Woo

[11] 4,244,845
[45] Jan. 13, 1981

[54] PRE-MIXED CATALYZED VINYL ACETATE CO-POLYMER ADHESIVE COMPOSITION

[75] Inventor: Ming C. Woo, Willingboro, N.J.

[73] Assignee: National Casein of New Jersey, Riverton, N.J.

[21] Appl. No.: 877,260

[22] Filed: Feb. 13, 1978

Related U.S. Application Data

[63] Continuation-in-part of Ser. No. 671,269, Mar. 29, 1976, Pat. No. 4,085,074.

[51] Int. Cl.$^3$ .............................................. C08L 1/28
[52] U.S. Cl. ......................... 260/17 R; 260/29.4 UA; 260/29.6 WA; 260/29.6 WB; 428/506; 428/514
[58] Field of Search .... 260/17 R, 29.6 WA, 29.6 WB

[56] References Cited

U.S. PATENT DOCUMENTS

| | | | |
|---|---|---|---|
| 3,301,809 | 1/1967 | Goldberg et al. | 260/29.6 WB |
| 3,563,851 | 2/1971 | Armour | 260/29.6 WA |
| 3,619,346 | 11/1971 | Sandler | 428/506 |

*Primary Examiner*—Edward M. Woodberry
*Attorney, Agent, or Firm*—Max R. Millman

[57] ABSTRACT

A pre-mixed adhesive composition comprised of a vinyl acetate co-polymer emulsion including a cross-linking catalyst and a cross-linking inhibitor providing a good cured water resistant Type II bond and extended shelf life so that the adhesive composition will not gel over an extended period of time and will therefore be usable for direct gluing application to semi-porous and porous substrates.

10 Claims, No Drawings

PRE-MIXED CATALYZED VINYL ACETATE CO-POLYMER ADHESIVE COMPOSITION

This is a continuation-in-part of my co-pending application, Ser. No. 671,269, filed Mar. 29, 1976, now U.S. Pat. No. 4,085,074 issued Apr. 18, 1978 and relates to cross-linkable vinyl acetate co-polymer emulsions containing a curing or cross-linking agent for use as an adhesive for porous and semiporous materials.

Heretofore, gluing operations using cross-linkable vinyl acetate polymer emulsions required the mixing of the emulsion with a catalyst, i.e. a curing or cross-linking agent prior to application to the substrates to be glued in pressing equipment, as, for example, in the Armour et al U.S. Pat. No. 3,563,851. Because the cross-linking of the resin occurs over a relatively short period of time after addition of the catalyst, the mix gels over that relatively short period of time and therefore cannot then be employed as a workable adhesive.

The primary object of this invention is to provide an adhesive emulsion comprising a co-polymerized cross-linkable vinyl acetate resin, a cross-linking catalyst and a cross-linking inhibitor, which adhesive provides a cured water resistant Type II bond and possesses increased shelf life and can therefore be used over a relatively long period of time for direct application to porous and semi-porous substrates for gluing in appropriate pressing equipment.

Another object of the invention is to provide an adhesive composition comprising a cross-linkable vinyl acetate co-polymer resin emulsion, an inorganic acid metal salt cross-linking catalyst and a basic organic cross-linking inhibitor, which adhesive composition provides a Type II water resistant bond and possesses a shelf life considerably extended over the shelf life of a mixture of the resin emulsion and catalyst alone.

Another object of the invention is to provide an adhesive composition of the character described which possesses a shelf life increased over that of the composition without the inhibitor and a shear strength of at least 50 psi using a one-half hour boil test following the procedure set forth in ASTM D-1151-72.

The foregoing objects are obtained by providing an aqueous resin emulsion containing vinyl acetate co-polymerized with N-alkylol derivatives of amides of alpha, beta-unsaturated carboxylic acids, such as N-methylol acrylamide, a protective hydrocolloid emulsifier such as polyvinyl alcohol or cellulosic dispersing agents, e.g. hydroxyethylcellulose, carboxymethylcellulose, etc., a cross-linking catalyst in the form of an acid metal salt such as aluminum chloride, aluminum nitrate, chromic chloride and chromic nitrate, and a cross-linking inhibitor in the form of an amine such as ammonia, the alkyl and alkanol amines, e.g. mono, di and triethylamine and mono, di and triethanolamine.

The resin emulsion is made by polymerization techniques known in the art using free radical or redox catalysts. A monomer mixture of about 90-98% by weight of vinyl acetate and about 2-10% by weight of an N-alkylol derivative of an amide of an alpha, beta-unsaturated carboxylic acid is refluxed at about 60°-90° C. with agitation in an aqueous medium containing in addition to the monomer mixture about 3-6% of a hydrocolloid by weight of the monomer mixture, the free radical or redox polymerization catalysts, a defoamer and an emulsifier. The reaction is carried on for about 3 to 6 hours and the resultant aqueous resin emulsion has a solids content of about 40-60%.

At present, this resin emulsion is used as a two-part adhesive for admixture with an inorganic acid metal salt cross-linking catalyst solution such as $AlCl_3$, $Al(NO_3)_3$, $CrCl_3$ and $Cr(NO_3)_3$ at the site where application of the adhesive in appropriate pressing equipment is to be carried out. The resin emulsion per se can be stored at room temperature for at least 3 months, but once the same is admixed with the cross-linking catalyst the mix has a considerably reduced shelf or pot life. Over a range of 1.0 to 12.0 parts by weight of the catalyst solution per 100 parts by weight of the resin emulsion, where the acidic salt concentration of the catalyst solution is about 0.21 gram moles per 100 gms catalyst solution, the shelf life varies from about 1 day to about 89 days. This mix yields a Type II water resistant bond as defined in Federal Specification MMM-A-188b, Nov. 8, 1960 entitled "Adhesive; Urea-Resin-Type (Liquid and Powder)", which is herein incorporated by reference.

In accordance with the instant invention, the resin emulsion includes about 0.0032 to 0.025 gram moles per 100 grams of emulsion of an inorganic acid metal salt catalyst and a cross-linking inhibitor in sufficient amount and concentration to at least increase, and preferably double, the shelf life of the resin emulsion plus catalyst alone and provide a bond whose shear strength is at least 50 psi when subjected to a preconditioning for one day and one-half hour boil test as set forth in par. 4.1 and condition 16 respectively of ASTM D-1151-72, which is herein incorporated by reference.

The inorganic metal metal salt cross-linking agent is preferably added to the resin emulsion in the form of a solution containing about 0.21 gram moles of the catalyst per 100 grams of the catalyst solution. Said catalyst solution is added to the resin emulsion in an amount of about 1.5 to 12.0 parts by weight of the catalyst solution to 100 parts by weight of the resin emulsion. Thus, there is present in the resin emulsion about 0.0032 to 0.025 gram moles of the catalyst per 100 grams of resin emulsion. The cross-linking inhibitor is present in the resin emulsion in an effective amount up to a maximum mole ratio of inhibitor to catalyst of about 0.7 to 1.7.

The preferred adhesive composition includes a resin emulsion (RE) comprising a monomer mixture of about 90-98% vinyl acetate (VA) and about 2-10% N-methylol acrylaminde (NMA), by weight, polymerized with the use of a redox or free radical type catalyst system in an aqueous medium containing about 5% polyvinyl alcohol, in the manner described hereinbefore, the solids content of the resultant emulsion being about 50% by weight. The resin emulsion is white, has a pH of 4.3 to 5.0, a viscosity of 3000-41,000 cps (25° C.) and a specific gravity of about 1.09. To this resin emulsion is added an aqueous solution of aluminum chloride in an amount of about 1.5 to 12.0 parts by weight of the aluminum chloride solution to 100 parts by weight of the resin emulsion, said aluminum chloride solution containing about 0.21 gram moles $AlCl_3$/100 gms solution, thus providing 0.0032 to 0.025 gram moles of $AlCl_3$ per 100 grams of resin emulsion, and triethanolamine (TEOA) in a mole ratio of TEOA/$AlCl_3$ up to about 0.7 to 1.7 as a maximum. To obtain an adhesive composition which will possess a shelf life which is increased over that of the resin emulsion plus catalyst alone and also possess a cured water resistance bond of at least 50 psi in a one-half hour boil test, the minimum TEOA/$AlCl_3$ mole ratio is about 0.1 to 0.2. A most practical adhesive is one in which the weight ratio of VA to NMA is in the range of 95/5 to 98/2.

The following are illustrative but non-limitative examples in table form of the adhesive compositions of the instant invention, control compositions and comparative results as to shelf life and shear strength.

The shelf or pot life end point is taken as the time at which the adhesive composition gels to the point that it will no longer flow from the container. The sample is not agitated during the total test period and the container is tightly capped so that no skin is formed.

The instant adhesive composition is directly applica-

TABLE

| Example No. | 1 | 2 | 3 | 4 | 5 | 6 | 7 | 8 | 9 |
|---|---|---|---|---|---|---|---|---|---|
| RE (Resin Emulsion), g | 100 | 100 | 100 | 100 | 100 | 100 | 100 | 100 | 100 |
| Monomer Ratio, VA/NMA, by wt. | 98/2 | 98/2 | 98/2 | 98/2 | 98/2 | 90/10 | 90/10 | 90/10 | 90/10 |
| AlCl$_3$*, aqueous solution, g | 2 | 2 | 2 | 10 | 10 | 2 | 2 | 10 | 10 |
| Triethanolamine (TEOA) 85 wt.%, g | — | 0.15 | 0.51 | — | 4.41 | — | 0.51 | — | 0.73 |
| Mole Ratio, TEOA/AlCl$_3$ | — | 0.2 | 0.7 | — | 1.2 | — | 0.7 | — | 0.2 |
| Initial pH | 3.2 | 3.5 | 3.9 | 2.7 | 4.0 | 3.3 | 3.9 | 2.7 | 3.45 |
| Initial Viscosity, cps (25° C.) | 850 | 1150 | 1050 | 650 | 450 | 33,750 | 33,250 | 20,000 | 18,750 |
| Shelf or Pot Life, days | 89 | 97 | 106+ | 72 | 103+ | 1 | 9 | 1 | 6 |
| O/N Cured | | | | | | | | | |
| Dry, psi - % W.F. | 1000-100 | 784-100 | 620-100 | 1000-100 | 722-85 | 840-42 | 662-15 | 704-93 | 736-52 |
| ½ hr. Boil, psi - % W.F. | 418-0 | 70-0 | 70-0 | 342-0 | 198-0 | 142-0 | 214-0 | 206-0 | 208-0 |
| 48 hr. Soak, psi - % W.F. | 475-3 | 430-0 | 332-38 | 528-0 | 330-0 | 464-0 | 350-0 | 494-3 | 500-0 |
| 2 Week Cured | | | | | | | | | |
| Dry, psi - % W.F. | 942-100 | 834-90 | 622-90 | 958-100 | 800-96 | 938-53 | 780-67 | 848-100 | 914-100 |
| 2 Cycle Boil, psi - % W.F. | 2-0 | 22-0 | 16-0 | 0-0 | 8-0 | 6-0 | 8-0 | 260-7 | 184-0 |
| 48 Hr. Soak, psi - % W.F. | 470-12 | 514-0 | 370-65 | 520-32 | 415-2 | 544-0 | 422-0 | 632-21 | 646-10 |

| Example No. | 10 | 11 | 12 | 13 | 14 |
|---|---|---|---|---|---|
| RE (Resin Emulsion), g | 100 | 100 | 100 | 100 | 100 |
| Monomer Ratio VA/NMA, by wt. | 90/10 | 95/5 | 95/5 | 95/5 | 95/5 |
| AlCl$_3$*, Aqueous solution, g | 10 | 8 | 8 | 4 | 4 |
| Triethanolamine (TEOA) 85 wt.%, g | 4.41 | 2.0 | — | 1.5 | — |
| Mole Ratio, TEOA/AlCl$_3$ | 1.2 | 0.68 | — | 1.0 | — |
| Initial pH | 4.1 | 4.0 | 2.9 | 4.2 | 3.3 |
| Initial Viscosity, cps (25° C.) | 15,000 | 1100 | 1500 | 2000 | 2900 |
| Shelf or Pot Life, days | 26 | 31 | 7 | 31 | 7 |
| O/N Cured | | | | | |
| Dry, psi - % W.F. | 622-37 | 602-100 | 503-100 | 530-100 | 523-100 |
| ½ hr. Boil, psi - % W.F. | 88-0 | 440-40 | 414-65 | 440-85 | 491-30 |
| 48 hr. Soak, psi - % W.F. | 366-0 | 514-84 | 500-100 | 426-100 | 506-60 |
| 2 Week Cured | | | | | |
| Dry, psi - % W.F. | 820-75 | 609-100 | 506-100 | 544-100 | 528-100 |
| 2 Cycle Boil, psi - % W.F. | 0-0 | 384-49 | 355-66 | 372-82 | 402-28 |
| 48 Hr. Soak, psi - % W.F. | 480-0 | 528-75 | 478-100 | 456-100 | 548-100 |

O/N = Overnight; W.F. = Wood Failure
*32° Baumé, approximately 28% by Wt. AlCl$_3$ (about 0.21 gm moles AlCl$_3$/100 g solution)
*About 0.21 gm moles AlCl$_3$/100 g solution The procedures used in testing the control and instant adhesive compositions of the Table were as follows. The test samples were prepared in accordance with ASTM D-906-64 (Reapproved 1970), herein incorporated by reference, and applied to the birch test panels at a glue spread rate of 40 lb./1000 sq. ft. single glue line, assembly time of one minute, a press temperature of 121° C., a press time of three minutes and a pressure of 150 psi.

The one-half hour boil test was carried out in accordance with ASTM D-1151-72 using a preconditioning under par. 4.1 of one day and condition 16, i.e. immersion in boiling water for one-half hour and determining the average strength after exposure in accordance with par. 5.2.1.

The 2-cycle boil test was carried out in accordance with Commercial Standard CS35-61, Hardwood Plywood, published by U.S. Dept. of Commerce, Sup. of Docs., Washington 25, D.C., which is herein incorporated by reference, par. 5.4.2 thereof.

The 48 hour soak test is carried out in accordance with the procedure of ASTM D-1151-72, condition 6, wherein the specimen is immersed in water at a temperature of 23° C. for 48 hours and then subjected to the shear strength test.

ble to semi-porous and porous substrates, such as hardwoods, softwoods, hardboard, particle board, high pressure laminates and similar materials in appropriate pressing equipment in open assembly time up to about five minutes and closed assembly time up to about twenty minutes. The adhesive is primarily applicable to hot press (pressures of about 25-200 psi) or high frequency cure although it will produce an effective Type II water resistant bond when pressed at room temperature (25° C.) for about 40 minutes. The press time will vary depending on the type of press, method of cure, temperature, spread rate, assembly time and type of substrates being bonded.

What is claimed is:

1. A pre-mixed catalyzed adhesive composition comprised of (a) an aqueous cross-linkable vinyl acetate resin emulsion of co-polymerized vinyl acetate, in which the co-polymerized vinyl acetate is made from a monomer mixture of about 90-98% vinyl acetate and about 2-10% of an N-alkylol derivative of an amide of an alpha, beta-unsaturated carboxylic acid in an aqueous medium containing about 3-6% by weight of a hydrocolloid selected from the group consisting of polyvinyl alcohol, hydroxyethylcellulose and carboxymethylcellulose, by weight of the monomer mixture, (b) an inorganic acid metal-salt cross-linking catalyst selected from the group consisting of aluminum chloride, aluminum nitrate, chromic chloride and chromic nitrate in an amount of about 0.0032 to 0.025 gram moles per 100 grams of the resin emulsion, and (c) a cross-linking inhibitor of triethanolamine wherein the mole ratio of the cross-linking inhibitor to catalyst ranges from a minimum of about 0.1 to 0.2 to a maximum of about 0.7 to 1.7.

2. The adhesive composition of claim 1 wherein the N-alkylol derivative of an amide of an alpha, beta-unsaturated carboxylic acid is N-methylol acrylamide.

3. The adhesive composition of claim 1 wherein the hydrocolloid is polyvinyl alcohol.

4. The adhesive composition of claim 1 wherein the catalyst is aluminum chloride.

5. A pre-mixed catalyzed adhesive composition comprised of (a) an aqueous cross-linkable vinyl acetate resin emulsion of co-polymerized vinyl acetate, in which the co-polymerized vinyl acetate is made from a monomer mixture of about 95–98% vinyl acetate and about 2–5% of an N-alkylol derivative of an amide of an alpha, beta-unsaturated carboxylic acid in an aqueous medium containing about 3–6% by weight of a hydrocolloid selected from the group consisting of polyvinyl alcohol, hydroxyethylcellulose and carboxymethylcellulose, by weight of the monomer mixture, (b) an inorganic acid metal salt cross-linking catalyst selected from the group consisting of aluminum chloride, aluminum nitrate, chromic chloride and chromic nitrate in an amount of about 0.0032 to 0.025 gram moles per 100 grams of the resin emulsion, and (c) a cross-linking inhibitor of triethanolamine wherein the mole ratio of the cross-linking inhibitor to catalyst ranges from a minimum of about 0.1 to 0.2 to a maximum of about 0.7 to 1.7.

6. A pre-mixed catalyzed adhesive composition comprised of (a) an aqueous cross-linkable vinyl acetate resin emulsion of copolymerized vinyl acetate, in which the copolymerized vinyl acetate is made from a monomer mixture of about 95–98% vinyl acetate and about 2–5% of N-methylol acrylamide in an aqueous medium containing about 3–6% of polyvinyl alcohol, by weight of the monomer mixture, (b) aluminum chloride as a cross-linking catalyst in an amount of about 0.0032 to 0.025 gram moles per 100 grams of the resin emulsion and (c) triethanolamine as a cross-linking inhibitor in a mole ratio of the triethanolamine to aluminum chloride in the range from a minimum of about 0.1 to 0.2 to a maximum of about 0.7 to 1.7.

7. A structure comprising two substrates bonded together by the adhesive composition of claim 1 in a cured condition.

8. A structure comprising two substrates bonded together by the adhesive composition of claim 5 in a cured condition.

9. A structure comprising two substrates bonded together by the adhesive composition of claim 6 in a cured condition.

10. A pre-mixed catalyzed adhesive composition comprised of (a) an aqueous cross-linkable vinyl acetate resin emulsion of copolymerized vinyl acetate, in which the copolymerized vinyl acetate is made from a monomer mixture of about 90–98% vinyl acetate and about 2–10% of N-methylol acrylamide in an aqueous medium containing about 3–6% of polyvinyl alcohol, by weight of the monomer mixture, (b) aluminum chloride as a cross-linking catalyst in an amount of about 0.0032 to 0.025 gram moles per 100 grams of the resin emulsion and (c) triethanolamine as a cross-linking inhibitor in a mole ratio of the triethanolamine to aluminum chloride in the range from a minimum of about 0.1 to 0.2 to a maximum of about 0.7 to 1.7.

* * * * *